(12) United States Patent
Manimaran et al.

(10) Patent No.: US 11,263,726 B2
(45) Date of Patent: Mar. 1, 2022

(54) METHOD, APPARATUS, AND SYSTEM FOR TASK DRIVEN APPROACHES TO SUPER RESOLUTION

(71) Applicant: HERE GLOBAL B.V., Eindhoven (NL)

(72) Inventors: Abinaya Manimaran, Chicago, IL (US); Krishna Kumar Balakrishnan, Chicago, IL (US); David Johnston Lawlor, Chicago, IL (US); Anish Mittal, San Francisco, CA (US); Zhanwei Chen, Richmond, CA (US)

(73) Assignee: HERE Global B.V., Eindhoven (NL)

( * ) Notice: Subject to any disclaimer, the term of this patent is extended or adjusted under 35 U.S.C. 154(b) by 291 days.

(21) Appl. No.: 16/414,542

(22) Filed: May 16, 2019

(65) Prior Publication Data
US 2020/0364830 A1 Nov. 19, 2020

(51) Int. Cl.
*G06T 3/40* (2006.01)
*G06T 7/73* (2017.01)
*G06N 3/08* (2006.01)
*G06T 5/00* (2006.01)

(52) U.S. Cl.
CPC ............. *G06T 3/4053* (2013.01); *G06N 3/08* (2013.01); *G06T 5/003* (2013.01); *G06T 5/009* (2013.01);
(Continued)

(58) Field of Classification Search
None
See application file for complete search history.

(56) References Cited

U.S. PATENT DOCUMENTS

| | | | |
|---|---|---|---|
| 9,396,523 B2 * | 7/2016 | Jancsary | ............ G06T 5/001 |
| 2018/0075581 A1 * | 3/2018 | Shi | ............ G06N 3/0472 |

(Continued)

FOREIGN PATENT DOCUMENTS

CN 107194872 A 9/2017

OTHER PUBLICATIONS

Liu, Heng, et al. "Single satellite imagery simultaneous super-resolution and colorization using multi-task deep neural networks." Journal of Visual Communication and Image Representation 53 (2018): 20-30. (Year: 2018).*

(Continued)

*Primary Examiner* — Samah A Beg
(74) *Attorney, Agent, or Firm* — Ditthavong, Steiner & Mlotkowski

(57) ABSTRACT

An approach is provided for generating a super-resolution image as a higher resolution version of an input image. The approach, for example, involves determining a set of tasks to be performed on the input image to facilitate generating the super-resolution image. The approach also involves selecting a combination of loss functions, wherein each loss function of the combination of loss functions is respectively a task-specific neural network pre-trained to perform a corresponding one of the set of tasks. The approach also involves training the super resolution neural network using the combination of loss functions as one or more layers of the super resolution neural network. The approach also involves using the trained super resolution neural network to generate the super-resolution image as a higher resolution version of the input image.

20 Claims, 12 Drawing Sheets

(52) U.S. Cl.
CPC ...... *G06T 7/73* (2017.01); *G06T 2207/20081* (2013.01); *G06T 2207/20084* (2013.01)

(56) References Cited

U.S. PATENT DOCUMENTS

| | | | |
|---|---|---|---|
| 2019/0005629 A1 | 1/2019 | Sharma et al. | |
| 2019/0095795 A1* | 3/2019 | Ren | G06N 3/082 |
| 2019/0385346 A1* | 12/2019 | Fisher | G06F 40/109 |

OTHER PUBLICATIONS

Johnson, Justin, Alexandre Alahi, and Li Fei-Fei. "Perceptual losses for real-time style transfer and super-resolution." European conference on computer vision. Springer, Cham, 2016. (Year: 2016).*

Haris et al., "Task-driven Super Resolution: Object Detection in Low-resolution Images", Mar. 30, 2018, pp. 1-26.

Alexey et al., "Generating Images with Perceptual Similarity Metrics Based on Deep Networks", published in 30th Conference on Neural Information Processing Systems (NIPS 2016), retrieved on May 16, 2019 from http://papers.nips.cc/paper/6158-generating-images-with-perceptual-similarity-metrics-based-on-deep-networks.pdf, pp. 1-9.

Office Action for European Patent Application No. 20174666.6-1210, dated Oct. 23, 2020, 10 pages.

Johnson et al., "Perceptual Losses for Real-Time Style Transfer and Super-Resolution", Jan. 1, 2016, pp. 1-18.

Ledig et al., "Photo-Realistic Single Image Super-Resolution Using A Generative adversarial Network", Sep. 15, 2016, 14 pages.

Zhu et al., "Super-resolution based generative adversarial network using visual perceptual loss function", Apr. 24, 2019, 11 pages.

* cited by examiner

US 11,263,726 B2

METHOD, APPARATUS, AND SYSTEM FOR TASK DRIVEN APPROACHES TO SUPER RESOLUTION

BACKGROUND

Modern location-based services and applications (e.g., autonomous driving) are increasingly demanding highly accurate and detailed digital map data (e.g., centimeter-level accuracy or better). For remote sensing imagery such as that obtained from satellites, airplanes, or drones, the image resolution and hence quality is characterized using the Ground Sampling Distance (GSD), the physical measure represented by one pixel in the image. The GSD is the distance between center points of each sample taken of the ground. Depending on the camera angle of the satellite, GSD could vary for different pixels in the image. Satellite imagery provided by vendors may have a resolution of 30 cm per pixel at best by Federal law.

For map making purposes, labeling and detection of features and landmarks in the remote sensing imagery with a certain level of accuracy has observed appreciable improvements using super resolution methods. Such an enhancement decreases the effective GSD in satellite imagery since it synthesizes sub-pixel information in imagery. Map service providers, however, face significant technical challenges to develop and optimize super resolution methods to generate super-resolution images at the target levels of accuracy.

Some Example Embodiments

Therefore, there is a need for task driven approaches to super resolution.

According to one embodiment, a method for generating a super-resolution image comprises determining a set of tasks to be performed on an input image to facilitate generating the super-resolution image. The method also comprises selecting a combination of loss functions, wherein each loss function of the combination of loss functions is respectively a task-specific neural network pre-trained to perform a corresponding one of the set of tasks. The method also comprises training the super resolution neural network using the combination of loss functions as one or more layers of the super resolution neural network. The trained super resolution neural network generates the super-resolution image as a higher resolution version of the input image.

According to another embodiment, an apparatus for generating a super-resolution image from an input image comprises at least one processor, and at least one memory including computer program code for one or more computer programs, the at least one memory and the computer program code configured to, with the at least one processor, cause the apparatus to generate the super-resolution image using a combination of loss functions as one or more layers of a super resolution neural network. Each loss function of the combination of loss functions is respectively a task-specific neural network that has been pre-trained to perform a corresponding one of a set of tasks determined to facilitate generating the super-resolution image, wherein the super-resolution image is a higher resolution version of the input image.

According to another embodiment, a non-transitory computer-readable storage medium for training a super resolution neural network carries one or more sequences of one or more instructions which, when executed by one or more processors, cause, at least in part, an apparatus to determine a set of tasks to be performed on an input image to facilitate generating a super-resolution image, wherein the super-resolution image is a higher resolution version of the input image. The apparatus is also caused to select a combination of loss functions. Each loss function of the combination of loss functions is respectively a task-specific neural network that has been pre-trained to perform a corresponding one of the set of tasks. The apparatus is further caused to train the super resolution neural network to generate the super-resolution image using the combination of loss functions as one or more layers of the super resolution neural network.

According to another embodiment, an apparatus for generating a super-resolution image comprises means for determining a set of tasks to be performed on an input image to facilitate generating the super-resolution image. The apparatus also comprises means for selecting a combination of loss functions, wherein each loss function of the combination of loss functions is respectively a task-specific neural network pre-trained to perform a corresponding one of the set of tasks. The apparatus further comprises means for training the super resolution neural network using the combination of loss functions as one or more layers of the super resolution neural network. The apparatus still further comprises means for using the trained super resolution neural network to generate the super-resolution image as a higher resolution version of the input image.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for task driven approaches to super resolution are disclosed.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
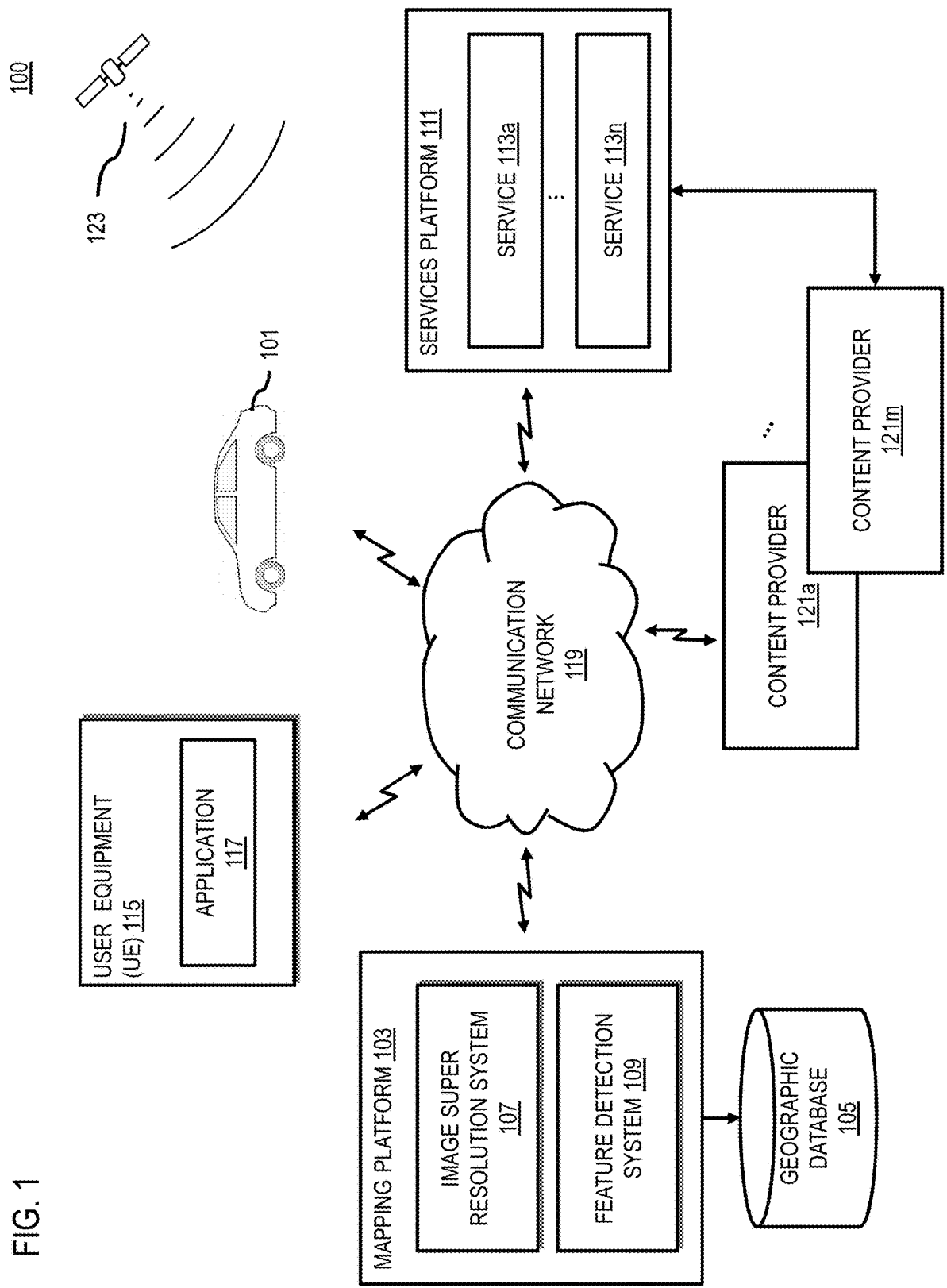
FIG. 1 is a diagram of a system capable of generating a super-resolution image, according to one embodiment.

FIG. 1 is a diagram of a system capable of generating a super-resolution image, according to one embodiment. Super resolution is a technique to construct high-resolution images from lower resolution ones. The various embodiments described herein relate to addressing the image enhancement problem where an input image is transformed into an output image of higher quality. For example, in the context of location-based services and applications such as autonomous vehicle navigation, there is a need for highly accurate and up-to-date maps. The embodiment below illustrates super resolving monochromatic satellite images whilst making them better for feature detection tasks in the context of location-based services such as autonomous vehicle navigation. For map making purposes and such, labeling and detection of features and landmarks in remote sensing imagery (such as those obtained from satellites, airplanes, drones, or other imaging platforms) has observed appreciable improvements using super-resolution methods.

For remote sensing imagery in the context of location-based services, the image resolution and related quality may be characterized using the Ground Sampling Distance (GSD), the physical measure represented by one pixel in the image. The GSD is the distance between center points of each sample taken of the ground. Depending on the camera angle of the satellite, airplane, drone, or other camera platform which captured the image, the GSD could vary for different pixels in the image. For example, satellite imagery provided by imaging vendors may have a resolution limited to 30 cm per pixel at best by Federal law. A super-resolution method of transforming an input image into an output image of higher quality may decrease the effective GSD in satellite imagery since it synthesizes sub-pixel information in imagery using natural scene statistics and provides a better perceptual experience.

To address the technical challenges associated with the image enhancement problem, the embodiments of the system 100 introduces a capability to transform an input image into an output of higher quality so that the image is better suited to a specific task or set of tasks. Quality could be defined using a combination of attributes relevant to the task(s)—like exposure, sharpness, and/or clarity—and tasks like feature detection, classification, recognition, and/or identification could be represented through loss functions in a machine learning paradigm. For example, to make road imagery suitable for labeling lanes by users, the system 100 could use a machine learning model (e.g., neural network) trained using a loss function that computes losses using other neural networks pre-trained for lane/feature detection, exposure correction, image deblurring, and/or edge enhancement, as applied to input images (e.g., satellite images or other road imagery).

More specifically, the system 100 may define and optimize task-specific loss functions for generating super-resolution images based on high-level features extracted from pretrained networks. The task-specific loss functions may each be a task-specific neural network pre-trained to perform a corresponding task, such as feature detection, correcting exposure, deblurring, edge enhancement, etc., with corresponding weights assigned to each task. In combination, these task-specific neural networks form a trained super-resolution neural network capable of transforming an input image into a higher-resolution, higher-quality output image better suited to a specific task or set of tasks. Other approaches have investigated the use of loss functions in the form of other networks, but there is no prior work that uses a suite of loss functions in the form of properties and combinations directed to a task or specific set of tasks. A real advantage comes from when multiple of these loss functions are combined and optimized together to produce an output that can solve desired problems.

One challenge in this problem is training the super-resolution neural network from a low-resolution input image set that does not have a corresponding super-resolved version. Illustratively, this problem may arise in the context of satellite imagery, where only the low resolution input image set is available. In an illustrative embodiment, to address this challenge, the low resolution input image set may be downsampled and then used to train the mapping from the downsampled set to the original image set. This mapping may then be applied to original images to get their super-resolved versions, assuming the learned mapping is general enough to be applied across different scales, such as fine or coarse scales. This is possible because the illustrative model is trained as a fully convolutional model that can upsample images of any dimension given as input.

As an illustrative embodiment, the system of FIG. 1 introduces a capability to generate super-resolution images in the context of location-based services such as autonomous vehicle navigation. In response to the need for higher resolution images, map service providers (e.g., operating a mapping platform 103) create more accurate and up-to-date high-resolution maps for automated driving (e.g., a geographic database 105) using the illustrative image super-resolution system 107 to enhance the resolution of digital map data stored in a geographic database 105. By way of example, the input imagery or image data in the geographic database 105 can be obtained from different sources such as but not limited to satellites, airplanes, drones, and/or other aerial vehicles. The super-resolved output images from the image super-resolution system 107 may then be processed by a feature detection system 109 to identify and label map features in the output images. In the illustrative embodiment, the image super resolution system 107 facilitates feature detection by the feature detection system 109 by decreasing the effective GSD in the satellite imagery.

In one embodiment, the feature detection system 109 can mark or label learnable map features of the super-resolution image output from the image super resolution system 107. The feature detection system 109 can use one or more designated properties for determining whether a candidate feature is learnable. For example, the designated properties can include but are not limited to: (1) having a consistent definition, (2) being uniquely identifiable, (3) having spatial sparsity, and/or (4) being generalizable across different geographic regions. In one embodiment, the feature selection process can be performed as part of an initial set up phase. By way of example, the category of curvilinear geometry intersections includes physical features (e.g., intersection features) which generally meet the above criteria to be candidates as machine learnable features which may be detected by the feature detection system 109. Curvilinear geometry intersection features are features defined by lines, markings, structures, etc. that are found at roadway intersections. The features can also include any geometric arrangement of the features (e.g., line intersections, angles, boundaries, etc.). Other examples of features may include crosswalks, lane lines, bus stops, and/or any other identifiable object or marking found at an intersection. In this mapping context, the output of this feature detection system 109 may be improved by the image super resolution system 107 which may decrease the effective GSD in the satellite imagery.

Illustrative embodiments for generating a super-resolution image from input image data using a layered super resolution neural network are described in more detail below.

Figure 2:
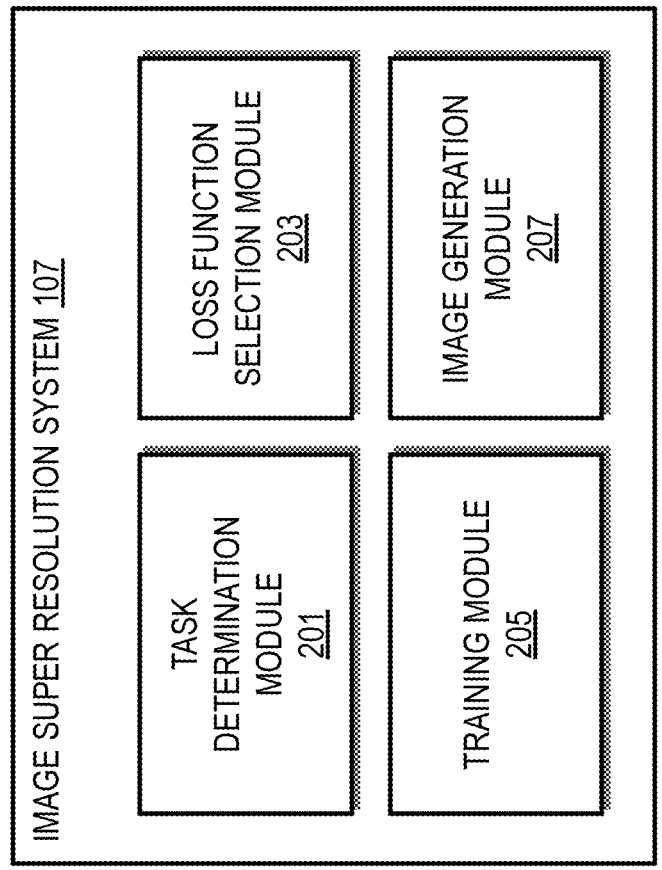
FIG. 2 is a diagram of components of an image super resolution system capable of generating a super-resolution image, according to one embodiment.

As shown in FIG. 1, in one embodiment, the mapping platform 103 includes the image super resolution system 107 and feature detection system 109 for detecting features in input image data. FIG. 2 is a diagram of components of the image super resolution system 107 that includes one or more components for generating a super-resolution image according to the various embodiments described herein. It is contemplated that the functions of these components may be combined or performed by other components of equivalent functionality. In this embodiment, the image super resolution system 107 includes a task determination module 201, a loss function selection module 203, a training module 205, and an image generation module 205. The above presented modules and components of the image super resolution system 107 can be implemented in hardware, firmware, software, or a combination thereof. Though depicted as a component of the mapping platform 103 in FIG. 1, it is contemplated that the image super resolution system 107 may be a separate entity or may be implemented as a module of any other component of the system 100 (e.g., a component of the feature detection system 109, services platform 111, services 113a-113n (also collectively referred to as services 113), vehicle 101, a user equipment (UE) 115, application 117 executing on the UE 115, etc.). In another embodiment, one or more of the modules 201-207 may be implemented as a cloud based service, local service, native application, or combination thereof. The functions of the image super resolution system 107 and the modules 201-207 are discussed with respect to FIGS. 3-9 below.

Figure 3:
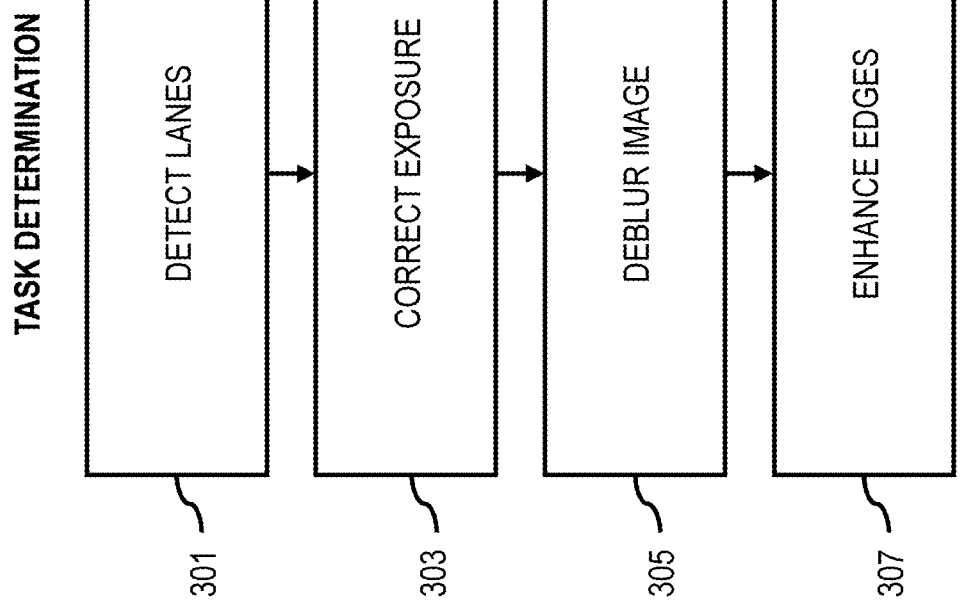
FIG. 3 is a flowchart of a process for task determination by an image super resolution system, according to one embodiment.
Figure 12:
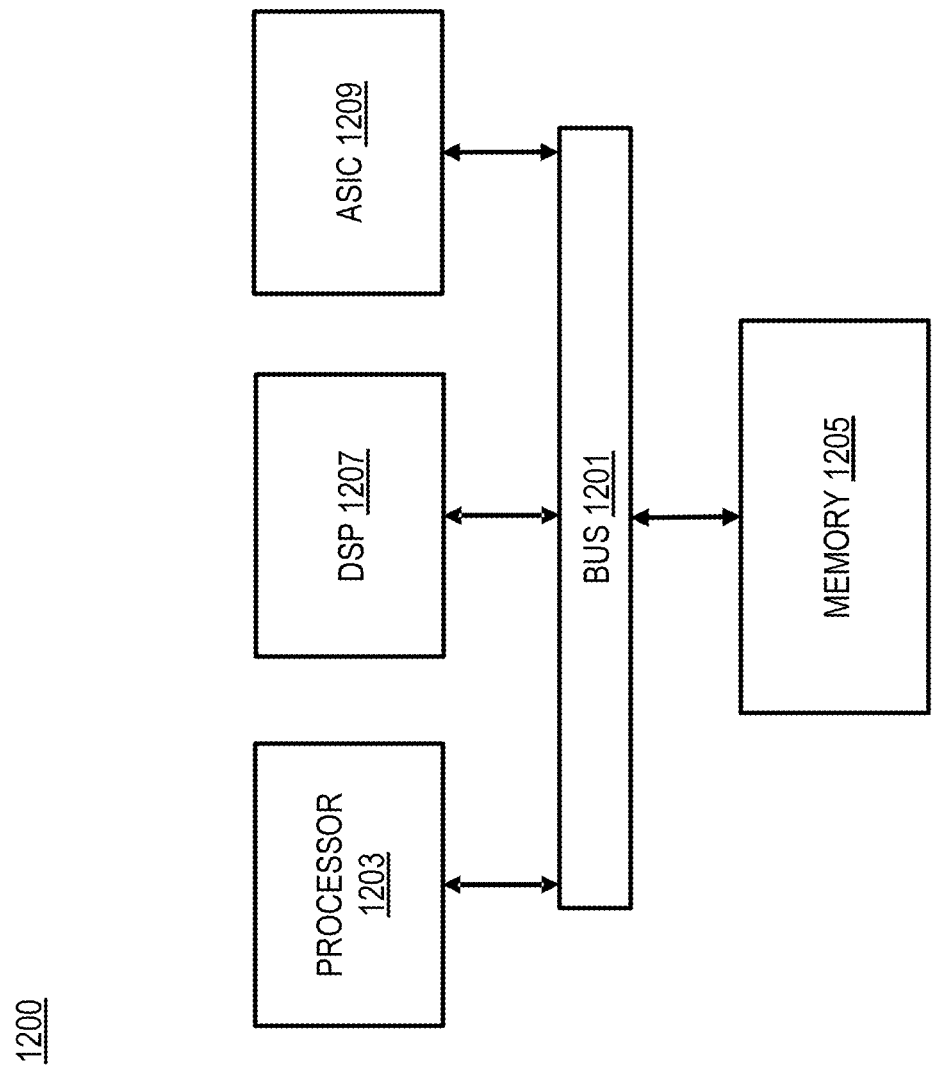
FIG. 12 is a diagram of a chip set that can be used to implement an embodiment.

FIG. 3 is a flowchart of an illustrative process 300 for task determination by the task determination module 201 of the image super resolution system 107. More specifically, the embodiments of the process 300 can be used to determine the tasks to be performed by the respective task-specific neural networks to be layered in the image super resolution system 107. In various embodiments, the image super resolution system 107 and/or any of the modules 201-207 of the image super resolution system 107 may perform one or more portions of the process 300 and may be implemented in, for instance, a chip set including a processor and a memory as shown in FIG. 12. As such, the image super resolution system 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In the illustrative task determination module 201 in the context of location-based services and satellite mapping, illustrative example tasks to be performed by the task-specific neural networks may include: 1) detecting lanes in the input image, as depicted in step 301; 2) correcting the exposure of the input image, as depicted in step 303; 3)

deblurring the input image, as depicted in step 305; and 4) enhancing the edges present in the input image, as depicted in step 307. This determined set of tasks is for illustrative purposes only, and a person of skill in the art would understand that the invention is not strictly limited to the illustrative selection of tasks. Other example tasks may include, but are not limited to: detecting intersections in the input image, correcting color in the input image, correcting discontinuities in the input image as a result of satellite images being joined, etc. Additionally, the illustrative set of tasks may be performed in a different order, depending on the image context, desired output, and anticipated post-processing of the output image. The illustrative image super resolution system 107 provides an advantage by allowing the determination of tasks and the ordering of those tasks to suit the specific context in which the super-resolution output image will be used.

Figure 4:
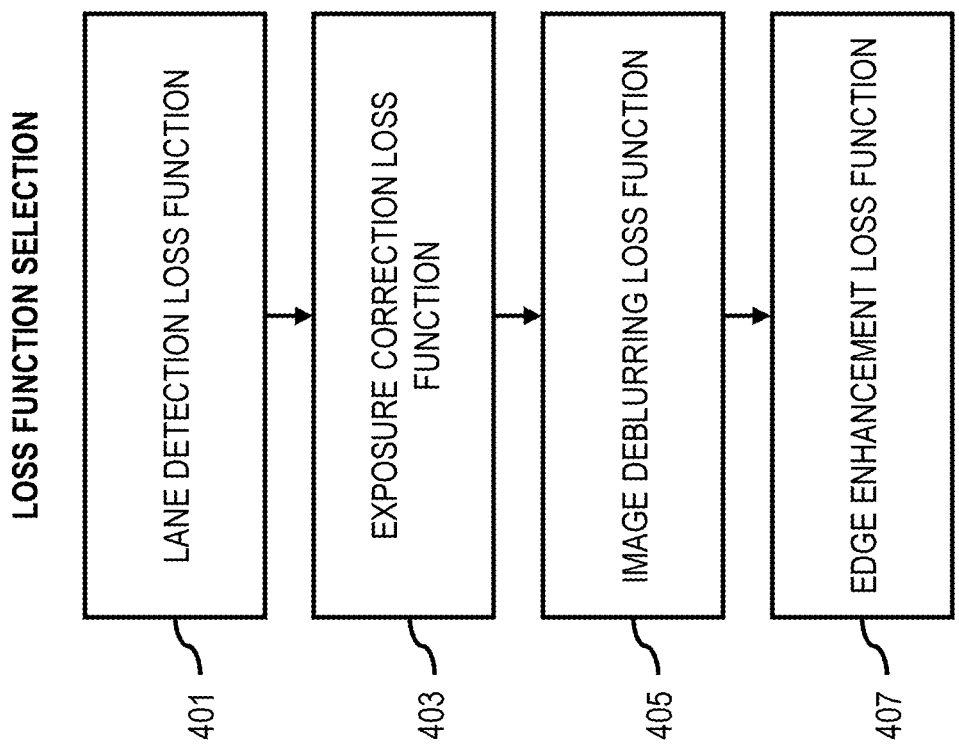
FIG. 4 is a flowchart of a process for selecting a combination of loss functions corresponding to determined tasks, according to one embodiment.

FIG. 4 is a flowchart of an illustrative process 400 for selecting the combination of loss functions corresponding to the determined tasks. In the illustrative embodiment, the loss function selection process 400 may be performed by the loss function selection module 203 of the image super resolution system 107. More specifically, the embodiments of the process 400 can be used to determine the task-specific neural networks to be layered in the image super resolution system 107. In various embodiments, the image super resolution system 107 and/or any of the modules 201-207 of the image super resolution system 107 may perform one or more portions of the process 400 and may be implemented in, for instance, a chip set including a processor and a memory as shown in FIG. 12. As such, the image super resolution system 107 and/or the modules 201-207 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In the illustrative loss function selection module 203 in the context of location-based services and satellite mapping, illustrative example loss functions to be layered to form the super resolution neural network may include: 1) a lane detection loss function, as depicted in step 401; 2) an exposure correction loss function, as depicted in step 403; 3) an image deblurring loss function, as depicted in step 405; and 4) an edge enhancement loss function, as depicted in step 407. This selected set of loss functions is for illustrative purposes only, and a person of skill in the art would understand that the invention is not strictly limited to the illustrative selection of loss functions. In the illustrative embodiment of the process 400 depicted in FIG. 4, the selected loss functions correspond to the tasks determined by the process 300 depicted in FIG. 3. Each selected loss function may be a task-specific neural network pre-trained to perform a corresponding task. For example, the lane detection loss function 401 may be a neural network pre-trained to detect and/or identify lanes in satellite image data. In response to the lane detection task 301 being determined by the task determination module 201, the lane detection loss function 401 may be selected by the loss function selection module 203. More generally, in response to any task being determined by the task determination module 201, a corresponding loss function may be selected by the loss function selection module 203, and the layered sequence of selected loss functions may correspond to the sequence of determined tasks.

Figure 5:
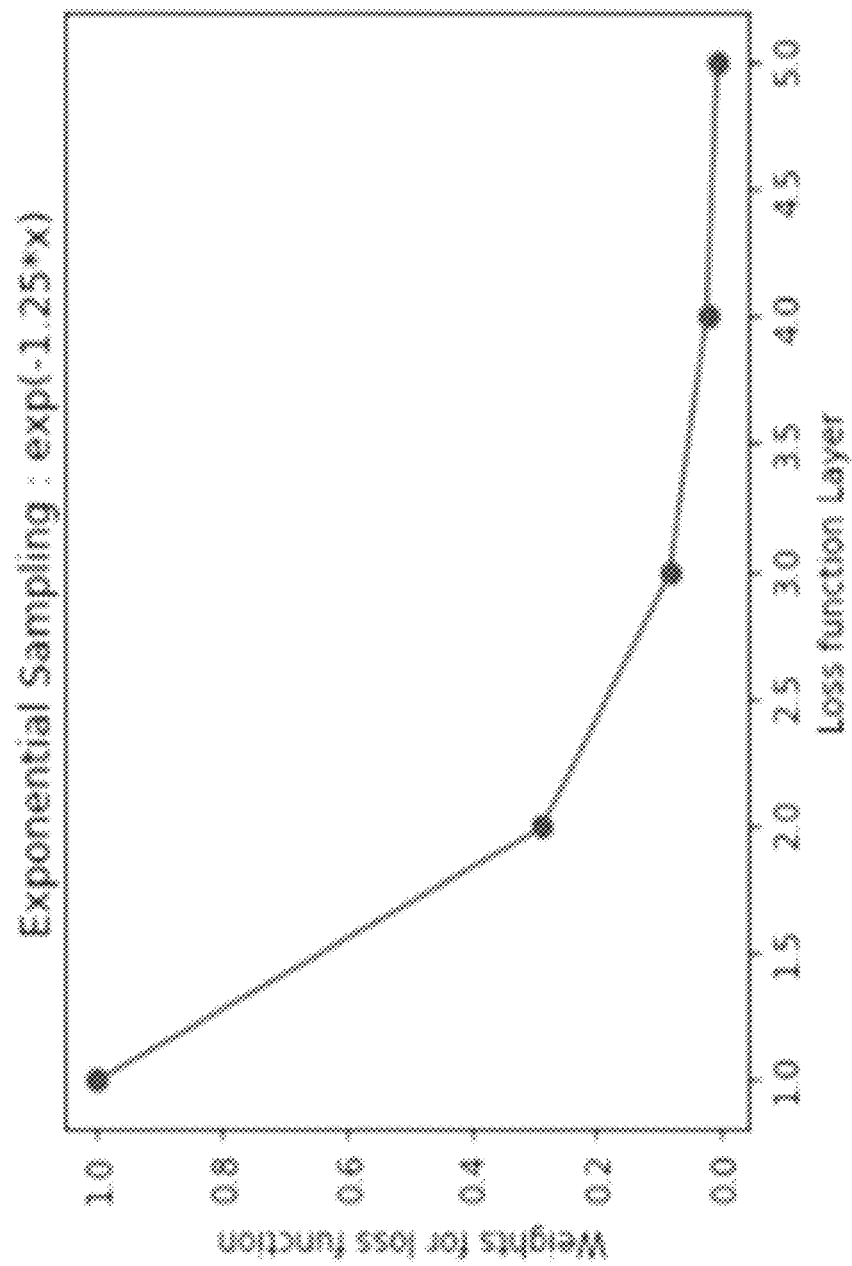
FIG. 5 is a diagram illustrating a curve corresponding to a decaying weight assigned to successive loss function layers, according to one embodiment.

According to an illustrative embodiment, each selected loss function layer may be assigned a corresponding weight in the super resolution neural network. FIG. 5 is a diagram illustrating a curve corresponding to a decaying weight assigned to successive loss function layers, according to an illustrative embodiment. In this example, there are five (5) loss function layers corresponding to five selected loss functions and five determined tasks to be performed by the super resolution neural network. According to this embodiment, experiments may be conducted to determine the per-pixel loss obtained from each layer of the loss network. Such experiments may show that the per-pixel loss obtained from certain layers of the loss network (in this example) produced sharper and more artifact-free images when compared to loss obtained from other layers of the network. Hence, the layers producing sharper and more artifact-free images are selected to serve as the initial layers of the network, and the layers are weighted according to a decaying exponential function. In the illustrative embodiment, the decaying exponential function may be $\exp(-1.25*x)$, where x corresponds to the loss function layer. This may produce a higher quality super resolution image compared to a network of unweighted layers or other methods. Other methods of assigning weights to the layers of the network, including an embodiment wherein equal weight is assigned to all layers of the network, may be implemented without departing from the scope of the invention. Selection of the weighting method may depend on the context for evaluating the quality of the super-resolution output image.

Figure 6:
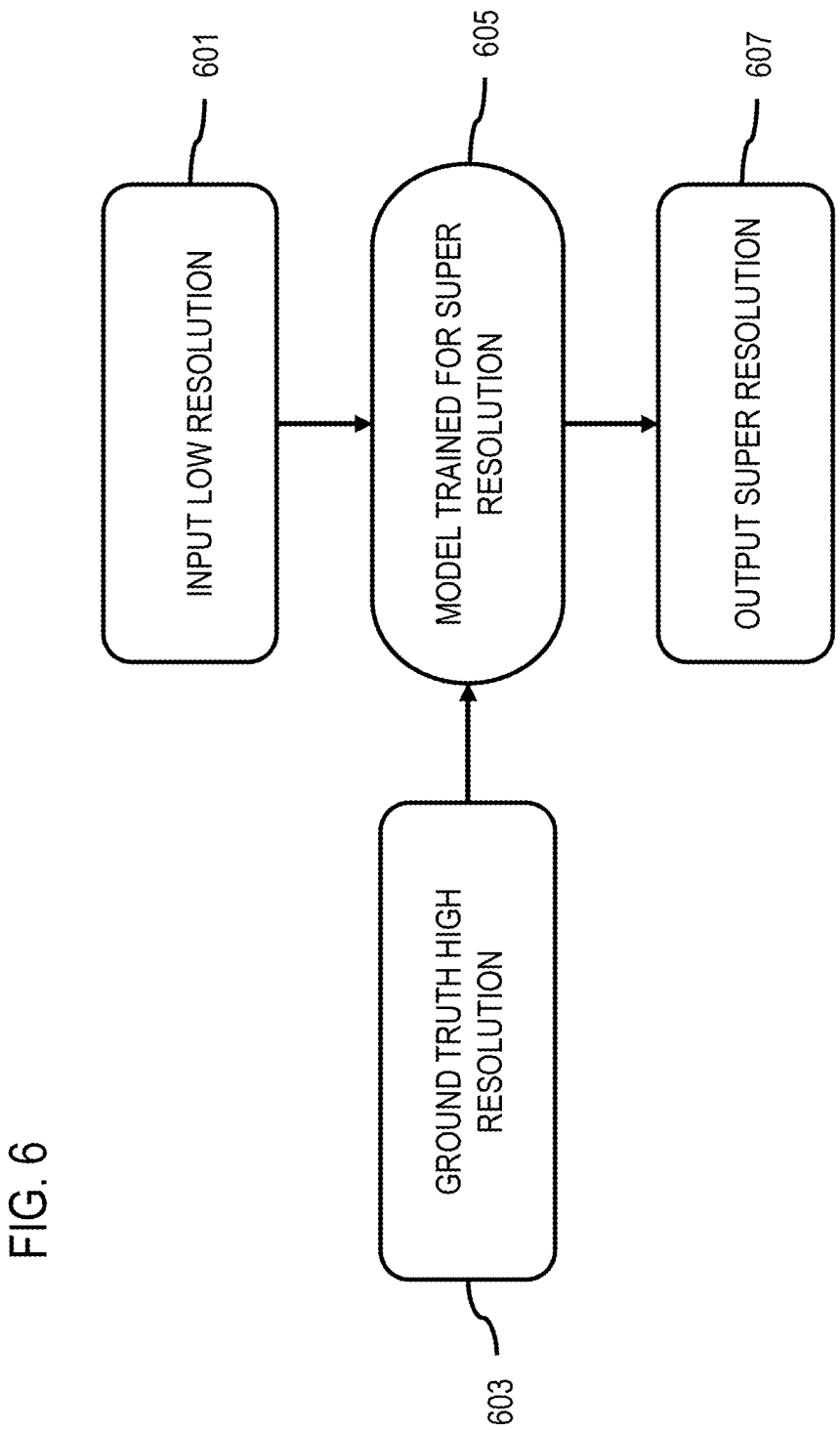
FIG. 6 is a diagram of a process for training a super resolution neural network from a low-resolution input image set that has a corresponding high resolution input image set, according to one embodiment.

FIG. 6 is a diagram illustrating a workflow of an illustrative process 600 for training the super resolution neural network from a low-resolution input image set that has a corresponding high resolution (i.e., ground truth, in this example) input image set. In step 601, a low-resolution input image set is provided as input to the super resolution neural network to generate a super resolution output image set. In step 603, a ground truth high resolution image set corresponding to the low-resolution input image set is provided for purposes of training the super resolution neural network in accordance with neural network training methods (e.g., by comparison of the output of the super resolution neural network to the ground truth high resolution, for purposes of determining loss and training the neural network) as would be understood by those of ordinary skill in the art. Accordingly, at step 605, the super resolution neural network may be trained to generate super-resolution output images from a training set of ground truth resolution images and corresponding low resolution images. The training module 205 can present the high resolution image data to a machine learning model of the super resolution system 107 during training using, for instance, supervised deep convolutional networks or equivalent. In other words, the training module 205 trains a machine learning model using the plurality of high resolution images to identify features depicted in the low resolution input images and to determine a corresponding loss in the output images relative to the high resolution images. Generally, a machine learning model (e.g., a neural network, set of equations, rules, decision trees, etc.) is trained to manipulate an input feature set to make a prediction about the feature set or the phenomenon/observation that the feature set represents. In one embodiment, the training features for the machine learning model include the determined pixel correspondence or pixel location of the selected map features in the high resolution images.

Figure 7:
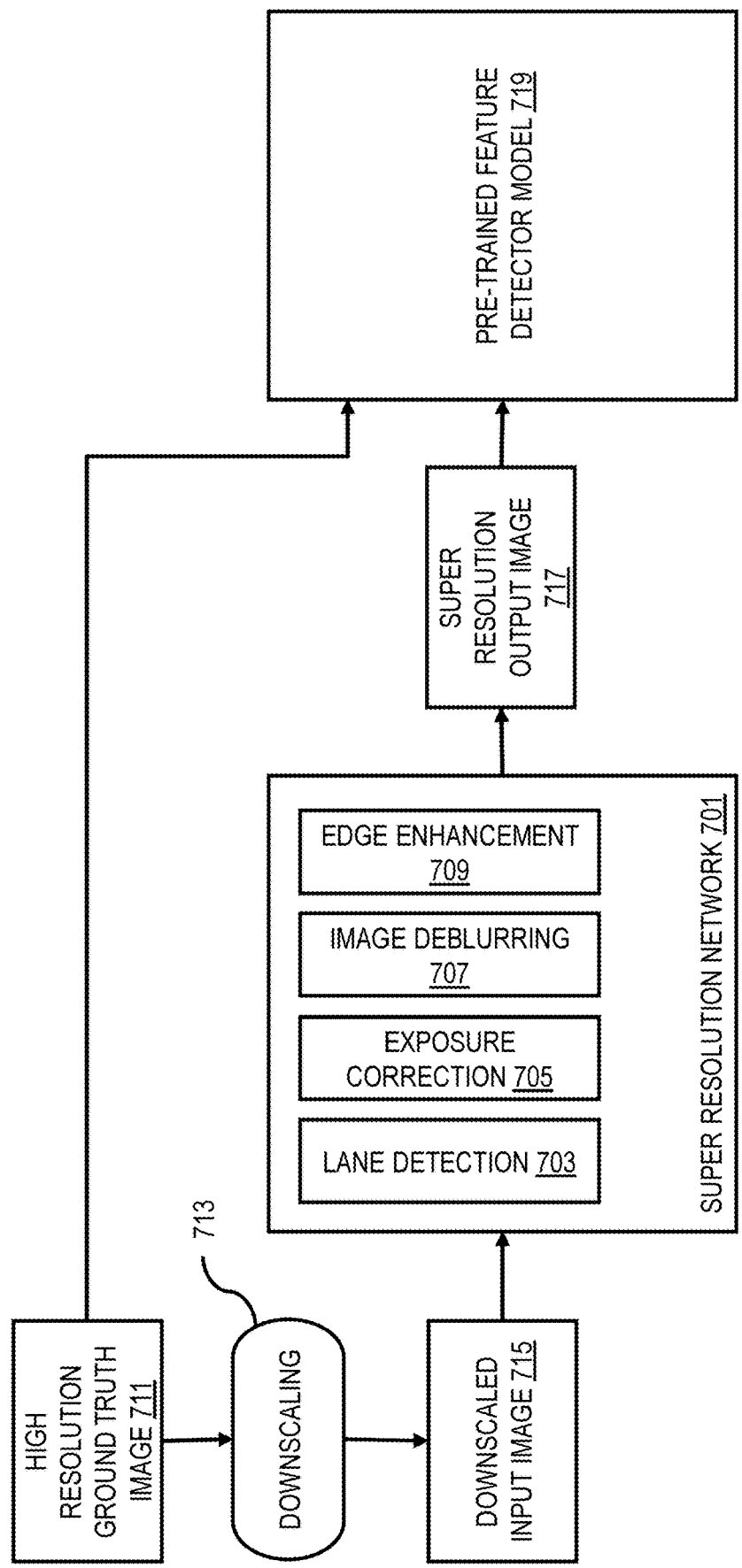
FIG. 7 is a diagram of a process for training a super resolution neural network from an input image set that does not have a corresponding higher resolution version, according to one embodiment.

FIG. 7 is a diagram illustrating a workflow for an illustrative process 700 for training the super resolution neural network from an input image set that does not have a corresponding higher resolution version. In various embodiments, the image super resolution system 107 and/or any of the modules 201-207 of the image super resolution system 107 may perform one or more portions of the process 700 and may be implemented in, for instance, a chip set including a processor and a memory as shown in FIG. 12. As such, the image super resolution system 107 and/or the modules 201-207 can provide means for accomplishing various parts of the process 700, as well as means for accomplishing embodiments of other processes described herein in conjunction with other components of the system 100. Although the process 700 is illustrated and described as a sequence of steps within a workflow, it is contemplated that various embodiments of the process 700 may be performed in any order or combination and need not include all of the illustrated steps.

In an illustrative embodiment, in the context of satellite and/or aerial imagery, imagery provided by imaging vendors may have a resolution limited to 30 cm per pixel at best by Federal law, thereby providing an input image set with an undesirable Ground Sampling Distance (GSD) in that specific embodiment. In this example, the super resolution neural network will be trained to generate an output image set with a decreased effective GSD for purposes of improving the detection of map features in the output image. In this embodiment, no corresponding pairs of low-resolution and high-resolution input image sets need to be provided for purposes of training. Rather, the super resolution neural network may still be trained even when only a ground truth satellite image set is provided. The loss function used for this training model is perceptual loss.

In this illustrative embodiment, the ground truth satellite image 711 is downscaled to generate a downscaled input image 715 with a lower resolution than the ground truth image. This downscaled input image 715 is then provided to the super resolution network 701 illustratively comprising four task-specific neural networks pre-trained to perform a corresponding set of tasks. In the context of location-based services such as autonomous vehicle navigation, illustrative determined tasks with corresponding loss function layers may include: 1) a lane detection task 703; 2) an exposure correction task 705; 3) an image deblurring task 707; and 4) an edge enhancement task 709. Each selected loss function layer may be assigned a corresponding weight in the super resolution neural network. The super resolution network 701 may thereby generate a super resolution output image 717 as a higher resolution version of the downscaled input image 715.

The super resolution output image 717 may then be provided to a pre-trained feature detector 719 to detect map features (such as crosswalks, intersections, etc.) in the image. Likewise, the ground truth image 711 may be provided to the pre-trained feature detector 719 to determine the loss for purposes of training the super resolution network 701. In an illustrative embodiment, the feature detector 719 may be trained on satellite images to detect line intersections on the images of interest. While training the super resolution model, at every iteration, the ground truth and predictions may be passed through the pre-trained feature detector model 719. In this embodiment, only forward pass is done on the loss network, and the backward pass usually used for training is disabled in the loss network. Once the ground truth and predictions are passed separately, we find the per-pixel loss between the feature layer outputs. With this information, corresponding weights may be assigned to each layer of the super resolution neural network and the layers may be ordered in response to the per-pixel loss obtained from each layer, as described above in reference to FIG. 5. Thus, the super resolution network 701 may be trained from a satellite and/or aerial input image set that does not have a corresponding super-resolved version.

In the above illustrative embodiment, although the satellite and/or aerial imagery provided by imaging vendors may have a resolution limited to 30 cm per pixel at best by Federal law, thereby providing an input image set with an undesirable Ground Sampling Distance (GSD) in that specific example, the present invention may also be applied to input satellite and/or aerial imagery having an even greater GSD and may generate super-resolution output images with a GSD corresponding to a resolution greater than 30 cm per pixel without departing from the scope of the invention.

In an alternative embodiment, while training the super resolution model, at every iteration, the ground truth and predictions may be passed through the pre-trained feature detector model 719 after each layer or after any number of layers of the super resolution network 701. In other words, the per-pixel loss between each layer of the network may be determined, and with this information, corresponding weights may be assigned to each layer of the super resolution neural network and the layers may be ordered in response to the per-pixel loss obtained from each layer, as described above in reference to FIG. 5.

In one embodiment, because the ground truth images can originate from any number of sources, the resolution, quality, etc. of each image can vary. For example, the resolution of top imagery of different satellites or other aerial sources can vary depending on the kind of camera sensors used. These different sensors then produce a plurality of images with different resolutions. This variance, in turn, can lead to uncertainty or error. Accordingly, the machine learning model can be further trained to calculate an uncertainty associated with the super resolution output image based on a characteristic of said each of the plurality of images, a respective source of said each of the plurality of images, or a combination.

In one embodiment, the training module 205 can incorporate a supervised learning model (e.g., a logistic regression model, RandomForest model, and/or any equivalent model) to train a machine learning model using the ground truth image data together with the super resolution output image data. For example, during training, the training module 205 uses a learner module that feeds images and derived feature sets (e.g., pixel correspondences, image attributes, etc.) into the image super resolution neural network to compute a predicted feature set (e.g., predicted map features presented in input images and/or other characteristics of those map features) using an initial set of model parameters.

The learner module then compares the predicted feature set in the super resolution output image to ground truth data (e.g., images labeled with known map feature pixel locations and/or attributes). For example, the learner module computes a loss function representing, for instance, an accuracy of the predictions for the initial set of model parameters. In one embodiment, the training module 205 computes a loss function for the training of the super resolution network based on the ground truth images. The learner module of the training module 205 then incrementally adjusts the network parameters until the network minimizes the loss function (e.g., achieves a maximum accuracy with respect to the manually marked labels). In other words, a pre-trained feature detector model 719 may be a classifier with model parameters adjusted to make accurate predictions with respect to the ground truth data.

Figure 8:
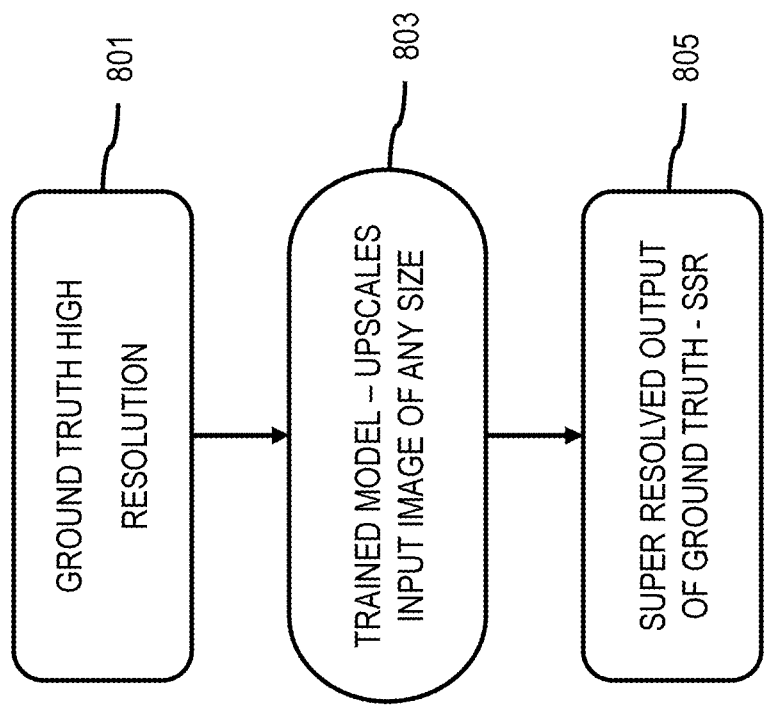
FIG. 8 is a diagram of a process for generating super-resolved output images of ground truth high resolution input images, according to one embodiment.

Once trained, the super resolution network may be used to generate super-resolved output images of ground truth high resolution input images, as illustrated by the process of FIG. 8. In contrast to the training process of FIG. 6, the trained model illustrated by the process of FIG. 8 may accept ground truth high resolution input images, as depicted in step 801. In step 803, the trained model may then upscale the input image using the selected combination of loss functions as layers of the super resolution neural network. In step 805, a super-resolved version of the ground truth input image is then output from the super resolution neural network. Thus, the super resolution network 701 may output super-resolved versions of satellite and/or aerial input image sets that do not have corresponding super-resolved versions.

Figure 9:
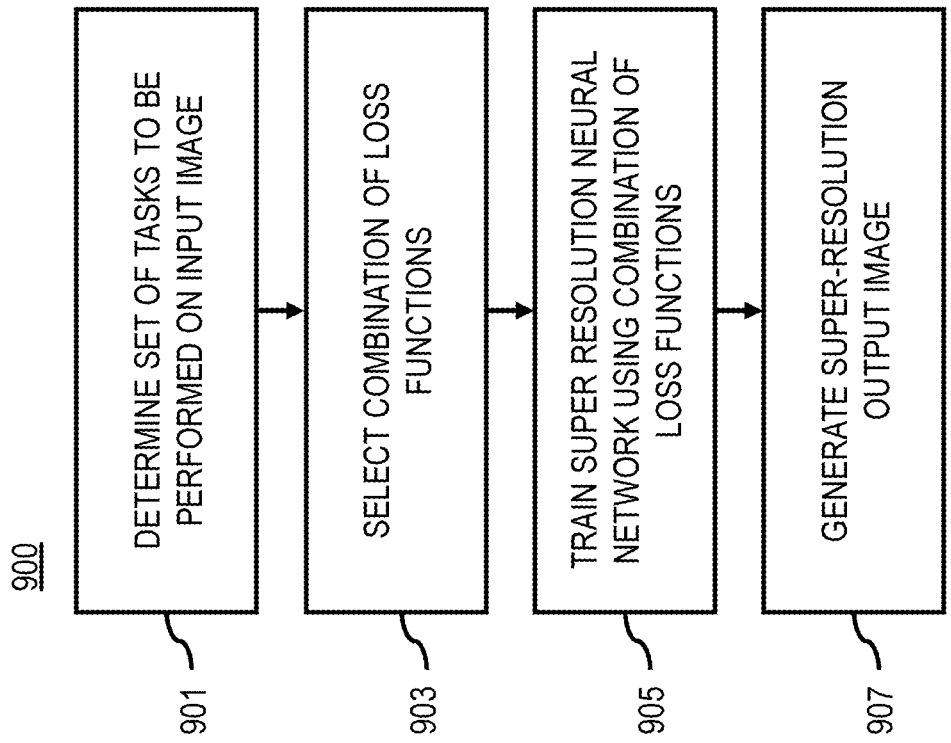
FIG. 9 is a flowchart of a process for generating a super-resolution image, according to one embodiment.
Figure 10:
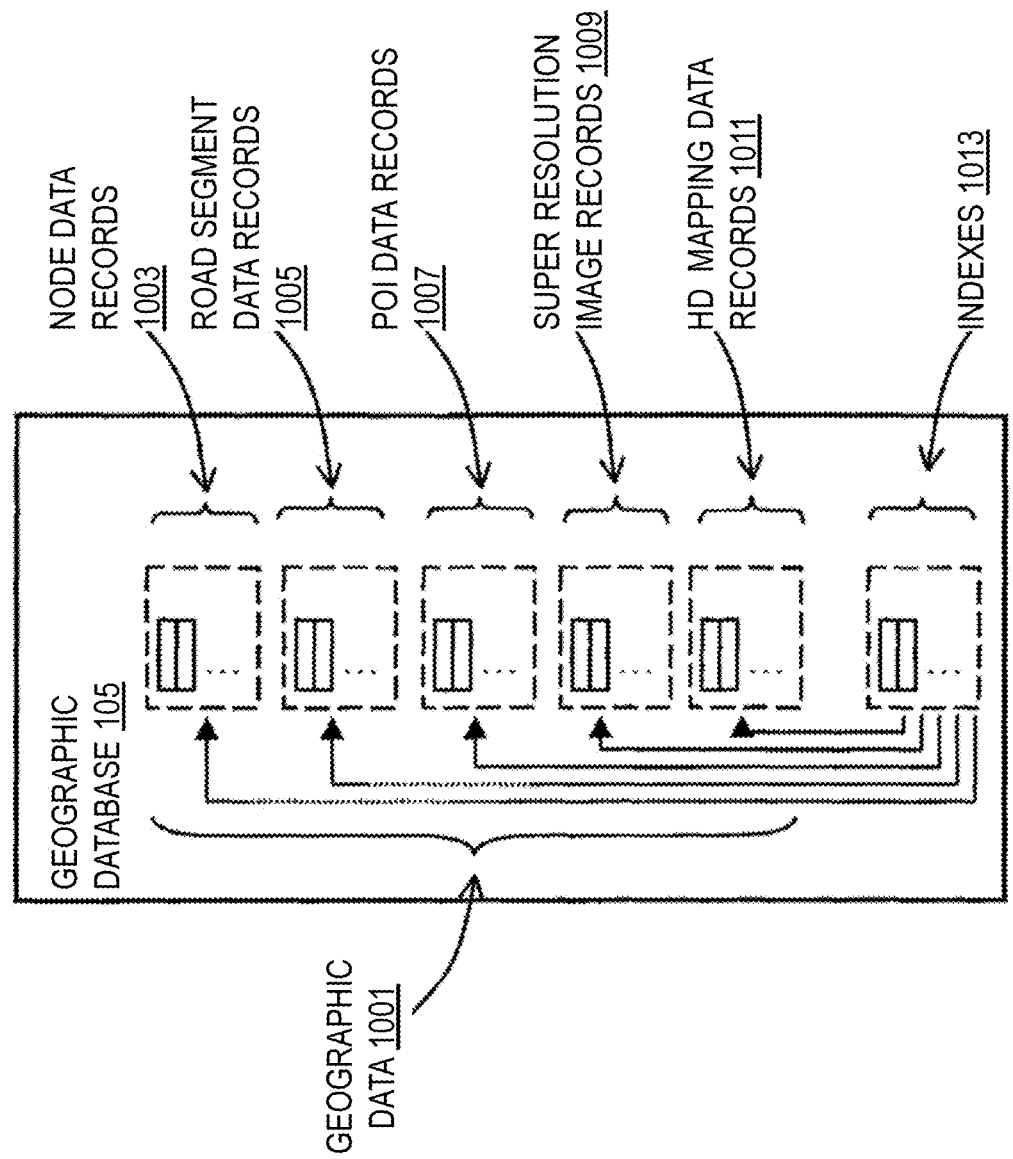
FIG. 10 is a diagram of a geographic database, according to one embodiment.

FIG. 9 is a flowchart of a process 900 for generating a super-resolution image, according to one embodiment. In various embodiments, the image super resolution system 107 and/or any of the modules 201-207 of the image super resolution system 107 may perform one or more portions of the process 900 and may be implemented in, for instance, a chip set including a processor and a memory as shown in FIG. 12. As such, the image super resolution system 107 and/or the modules 201-207 can provide means for accomplishing various parts of the process 900, as well as means for accomplishing embodiments of other processes described herein in conjunction with other components of the system 100. Although the process 900 is illustrated and described as a sequence of steps, it is contemplated that various embodiments of the process 900 may be performed in any order or combination and need not include all of the illustrated steps.

In step 901, the task determination module 201 of the image super resolution system 107 determines a set of tasks to be performed on an input image to facilitate generating a super-resolution image. For example, in the context of a satellite and/or aerial image for purposes of location-based services such as autonomous vehicle navigation, the task determination module 201 may determine the sequence of tasks illustrated in FIG. 3, such as: 1) a lane detection task 301; 2) an exposure correction task 303; 3) a deblurring task 305; and 4) an edge enhancement task 307.

In step 903, the loss function selection module 203 of the image super resolution system 107 selects a combination of loss functions, wherein each loss function is respectively a task-specific neural network pre-trained to perform a corresponding one of the set of determined tasks. For example, in the context of a satellite and/or aerial image for purposes of location-based services such as autonomous vehicle navigation, the loss function selection module 203 may select the sequence of loss functions illustrated in FIG. 4, such as: 1) a lane detection loss function 401; 2) an exposure correction loss function 403; 3) a deblurring loss function 405; and 4) an edge enhancement loss function 407.

In step 905, the training module 205 of the image super resolution system 107 trains the super resolution neural network using the combination of selected loss functions as layers of the super resolution neural network. For example, in the context of a satellite and/or aerial image for purposes of location-based services such as autonomous vehicle navigation, where (in this example) the ground truth satellite and/or aerial input image set does not have a super-resolved version, the training module 205 may implement the process 700 of FIG. 7, wherein the ground truth input image 711 is downscaled and provided to the super resolution network 701 for purposes of training the image super resolution system 107 against the ground truth image set. In an alternate embodiment, where the input image set is a low resolution image set having a corresponding high resolution image set, the training module 205 may implement the process 600 of FIG. 6, wherein the low resolution input image set is used to generate the output super resolution image set for purposes of training the image super resolution system 107 against the corresponding high resolution image set. In another alternate embodiment, the image super resolution system 107 may be pre-trained, thereby obviating the need for a training module 205 and step 905 of process 900. In yet another alternate embodiment, the image super resolution system 107 may be pre-trained, but a training module 205 and step 905 of process 900 may still be provided to further train and refine the super resolution neural network.

In step 907, the image generation module 207 of the image super resolution system 107 performs the determined tasks using the selected combination of task-specific neural networks to generate the super-resolution image as a higher resolution version of the input image.

In one embodiment, the embodiments of the image super resolution system 107 can be used to enable a variety of sophisticated services and applications. For example, autonomous driving has quickly become an area of intense interest where machine learning in combination with computer vision systems can be used. One application of vision techniques in autonomous driving is localization of the vehicle 101 with respect to map features (e.g., reference locations with highly accurate known locations). In one embodiment, the system 100 (e.g., the mapping platform 103) can facilitate detecting and labeling map features using the super-resolution output images generated according to the embodiments as described herein. These map features can then be used as reference markers by vehicles 101 to localize themselves.

Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving (e.g., autonomous driving) in many areas. One way to achieve this level of accuracy is to use visual odometry, in which map features (e.g., ground control points) are detected and/or labeled from imagery using feature prediction models (i.e., a machine learning classifier). These features can then be matched to a database of ground control points to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., ground control points based on intersection features such as lane markings, lane lines, etc.) can provide better and more accurate localization.

A vehicle 101, for instance, can use computer vision to identify a known map feature (e.g., a crosswalk corner), and then estimate its distance to the map feature. Because the location of the map feature is known with high accuracy, the vehicle 101 can compute its distance to the map feature to use as a distance offset to the known location to localize itself with a corresponding high degree of accuracy. Understanding one's location on a map enables planning of a route, both on fine and coarse scales, but requires a map with a sufficiently small GSD. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to map features enables the incorporation of other real-time information into route planning. Such information could include traffic, areas with unsafe driving conditions (ice, fog, potholes, e.g.), and temporary road changes like construction.

Returning to FIG. 1, as shown, the system 100 includes the mapping platform 103 which incorporates the image super resolution system 107 for generating a super-resolution image according the various embodiments described herein. In addition, the mapping platform 103 can include the feature detection system 109 configured to use machine learning to detect objects or features (e.g., intersection features) depicted in images that can be used for determining the loss of the super resolution neural network. The feature detection system 109 may also include a detector of a feature that is to be labeled in the super-resolution image. For example, with respect to autonomous, navigation, mapping, and/or other similar applications, the feature detection system 109 can detect map features associated with the output images and generate map feature data (e.g., location data) and associated prediction confidence values/uncertainties, according to the various embodiments described herein. The determination of tasks to be performed on the input image and the corresponding selection of task-specific neural networks may be specifically directed to detecting and labeling map feature data (e.g., location data) associated with the output images. For example, the selection of task-specific neural networks may be optimized to improve the quality of the feature detection system 109 in the specific context of identifying and labeling intersections, lane lines, and/or crosswalks by enhancing the quality of those features in satellite and/or aerial image data.

In one embodiment, the image super resolution system 107 and/or feature detection system 109 include a neural network or other machine learning system to make predictions from machine learning models. For example, when the input to the machine learning model are images used for visual odometry, the features of interest can include map features detected in the images to support localization of, e.g., a vehicle 101 or other similar applications within the sensed environment. In one embodiment, the neural network of the image super resolution system 107 is a traditional convolutional neural network which consists of multiple layers of collections of one or more neurons which are configured to process a portion of an input image. In one embodiment, the receptive fields of these collections of neurons (e.g., a receptive layer) can be configured to correspond to the area of an input image delineated by a respective a grid cell within the image.

In one embodiment, the image super resolution system 107 and/or the feature detection system 109 also have connectivity or access to a geographic database 105 which stores the super-resolution imagery generated according to the embodiments described herein. In one embodiment, the geographic database 105 includes representations of mapped features to facilitate visual odometry to increase localization accuracy. In one embodiment, the image super resolution system 107 and/or feature detection system 109 have connectivity over a communication network 119 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 113 uses the output of the machine learning system 107 and/or of the computer vision system 109 (e.g., ground control point data) to localize the vehicle 101 or user equipment (UE) 115 (e.g., a portable navigation device, smartphone, portable computer, tablet, etc.) to provide services 113 such as navigation, mapping, other location-based services, etc.

In one embodiment, the image super resolution system 107 and/or feature detection system 109 may be a platform with multiple interconnected components. The image super resolution system 107 and/or feature detection system 109 may include multiple servers, intelligent networking devices, computing devices, components and corresponding software for providing parametric representations of detected map features. In addition, it is noted that the image super resolution system 107 and/or feature detection system 109 may be a separate entity of the system 100, a part of the one or more services 113, a part of the services platform 111, or included within the UE 115 and/or vehicle 101.

In one embodiment, content providers 121a-121m (collectively referred to as content providers 121) may provide content or data (e.g., including geographic data, parametric representations of mapped features, etc.) to the geographic database 105, the image super resolution system 107, the feature detection system 109, the services platform 111, the services 113, the UE 115, the vehicle 101, and/or an application 117 executing on the UE 115. The content provided may be any type of content, such as map content, textual content, audio content, video content, image content, etc. In one embodiment, the content providers 121 may provide content that may aid in the detecting and classifying of lane lines and/or other map features in image data and estimating the quality of the detected features. In one embodiment, the content providers 121 may also store content associated with the geographic database 105, image super resolution system 107, feature detection system 109, services platform 111, services 113, UE 115, and/or vehicle 101. In another embodiment, the content providers 121 may manage access to a central repository of data, and offer a consistent, standard interface to data, such as a repository of the geographic database 105.

In one embodiment, the UE 115 and/or vehicle 101 may execute a software application 117 to capture image data or other observation data useful for generating super-resolution output images from ground truth satellite and/or aerial input images. By way of example, the application 117 may also be any type of application that is executable on the UE 115 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the image super resolution system 107 and/or feature detection system 109 and perform one or more functions associated with generating a super-resolution image from image data alone or in combination with the image super resolution system 107.

By way of example, the UE 115 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.). In one embodiment, the UE 115 may be associated with the vehicle 101 or be a component part of the vehicle 101.

In one embodiment, the UE 115 and/or vehicle 101 are configured with various sensors for generating or collecting environmental image data (e.g., for processing by the image super resolution system 107 and/or feature detection system 109), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 115 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the image super resolution system 107, feature detection system 109, services platform 111, services 113, UE 115, vehicle 101, and/or content providers 121 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2)

header, an internetwork (layer 3) header and a transport (layer 4) header, and various application (layer 5, layer 6 and layer 7) headers as defined by the OSI Reference Model.

Figure 11:
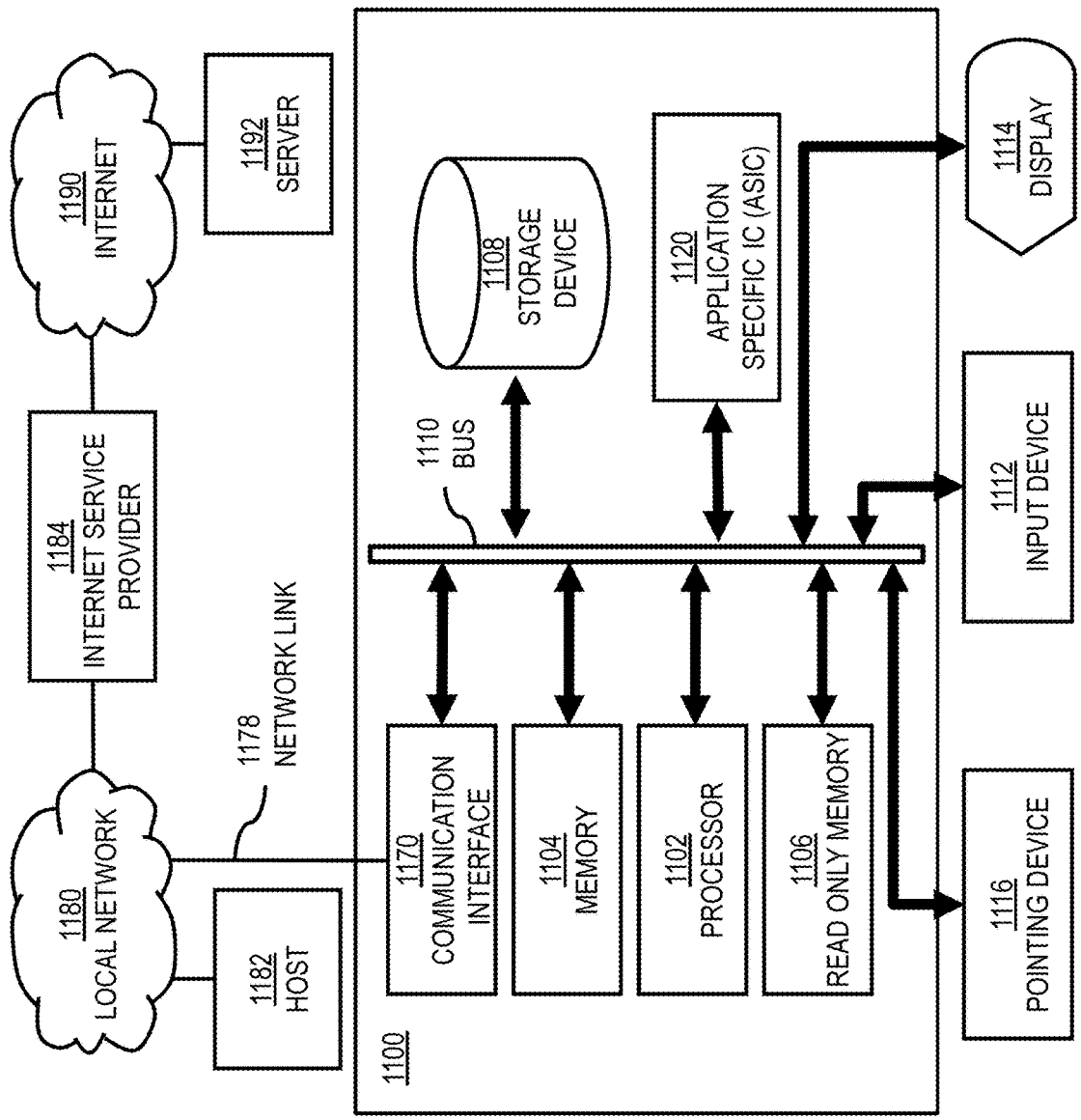
FIG. 11 is a diagram of hardware that can be used to implement an embodiment.

FIG. 11 is a diagram of a geographic database, according to one embodiment. In one embodiment, the geographic database 105 includes geographic data 1101 used for (or configured to be compiled to be used for) mapping and/or navigation-related services, such as for video odometry based on the mapped features (e.g., lane lines, road markings, signs, etc.). In one embodiment, the geographic database 105 includes high resolution or high definition (HD) mapping data that provide centimeter-level or better accuracy of map features. For example, the geographic database 105 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1103, road segment or link data records 1105, POI data records 1107, super-resolution image records 1109, HD mapping data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 105. In one embodiment, the indexes 1113 may be used to quickly locate data without having to search every row in the geographic database 105 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about points of interest (POIs) and their respective locations in the POI data records 1107. The geographic database 105 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 105 can also include super resolution image records 1109 for storing the super resolution images generated from satellite and/or aerial images according to the various embodiments described herein. In addition, the super resolution image records 1109 can also store training and evaluation data, machine learning models, annotated observations, and/or any other data generated or used by the system 100 according to the various embodiments described herein. By way of example, the super resolution image records 1109 can be associated with one or more of the node records 1103, road segment records 1105, POI data records 1107, and/or HD mapping data records 1111 to support localization or visual odometry based on the features stored therein and the corresponding estimated quality of the features. In this way, the records 1109 can also be associated with or used to classify the characteristics or metadata of the corresponding records 1103, 1105, 1107, and/or 1111.

In one embodiment, the HD mapping data records 1111 model road surfaces and other map features to centimeter-level or better accuracy. The HD mapping data records 1111 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1111 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111. The super resolution image records 1109 may be used to improve the accuracy of the HD mapping data records 1111; or, conversely, the HD mapping data records 1111 may be used to facilitate feature detection and training of the super resolution neural network to improve the accuracy of the super resolution image records 1109.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 105 can be maintained by the content provider 121 in association with the services platform 111 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 115) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generating a super-resolution image may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 11 illustrates a computer system 1100 upon which an embodiment of the invention may be implemented. Computer system 1100 is programmed (e.g., via computer program code or instructions) to generate a super-resolution image as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to generating a super-resolution image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for generating a super-resolution image. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for generating a super-resolution image, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 119 for determining ground control points from image data.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to generate a super-resolution image as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine ground control points from image data. The memory 1205 also stores the data associated with or generated by the execution of the inventive steps.

Figure 13:
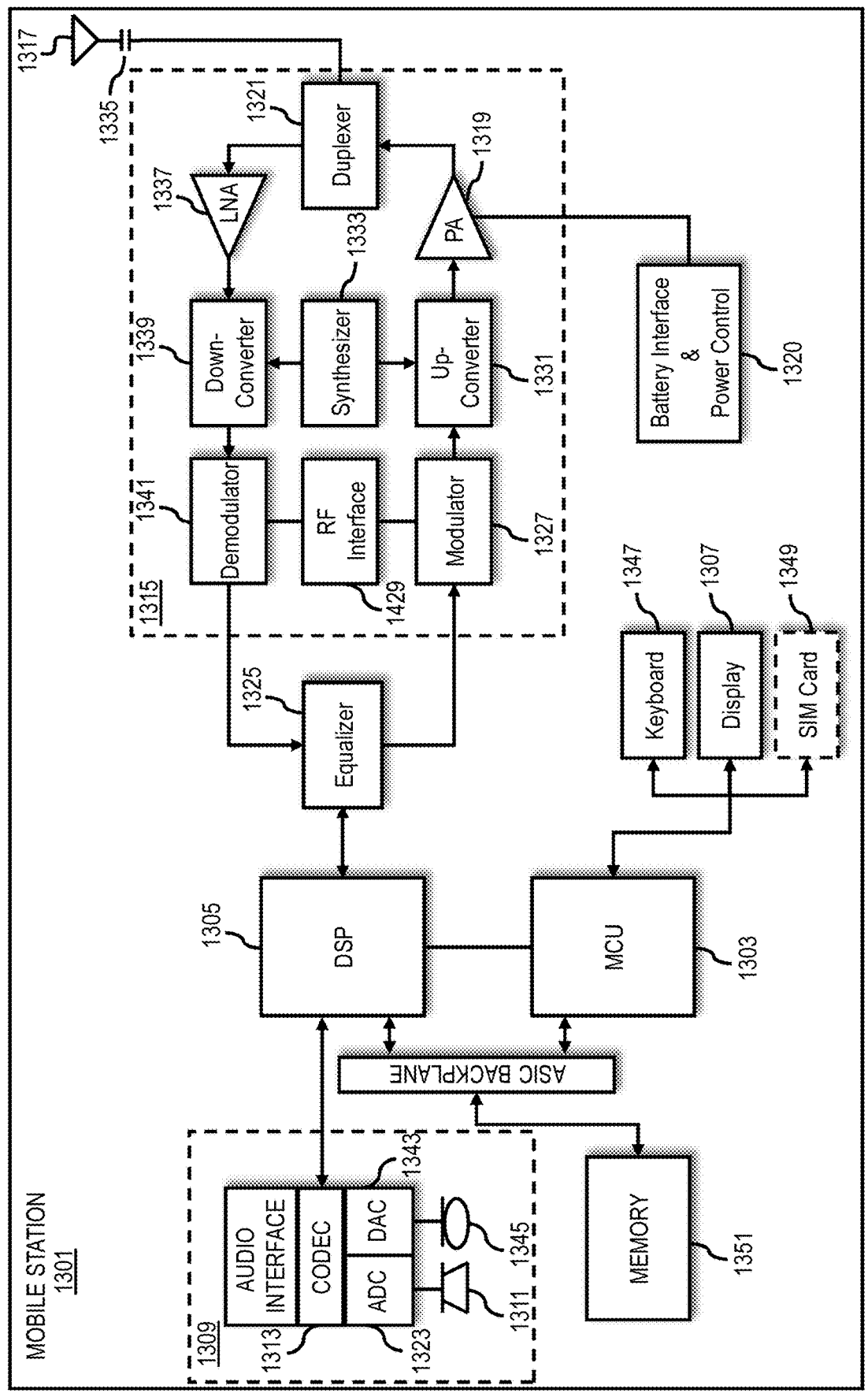
FIG. 13 is a diagram of a mobile terminal (e.g., handset) that can be used to implement an embodiment.

FIG. 13 is a diagram of exemplary components of a mobile terminal (e.g., UE 115 or embedded component of the vehicle 101) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to determine ground control points from image data. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RANI memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating a super-resolution image comprising:
   determining a set of tasks to be performed on an input image to facilitate generating the super-resolution image suited to another specific task or set of tasks;
   selecting a combination of loss functions directed to the another specific task or set of tasks, wherein each loss function of the combination of loss functions is respectively a task-specific neural network pre-trained to perform a corresponding one of the set of tasks; and
   training a super resolution neural network using the combination of loss functions as one or more layers of the super resolution neural network,
   wherein the trained super resolution neural network generates the super-resolution image as a higher resolution version of the input image.

2. The method of claim 1, wherein at least one of the task-specific neural network includes a detector of a feature that is to be labeled in the super-resolution image.

3. The method of claim 2, wherein the feature includes a map feature.

4. The method of claim 3, wherein the map feature is determined to be learnable based on designated properties.

5. The method of claim 2, wherein the task-specific neural network is pre-trained to enhance the feature in image data.

6. The method of claim 5, wherein the enhancing of the feature includes an image exposure correction, an image deblurring, an edge enhancement, or a combination thereof.

7. The method of claim 1, further comprising:
   incorporating the combination of loss functions with a designated initial number of layers of the super-resolution neural network.

8. The method of claim 1, further comprising:
   determining a respective weight for said each loss function incorporated into the super-resolution neural network.

9. The method of claim 1, wherein the set of tasks are associated with a use of the super-resolution image.

10. The method of claim 9, wherein the user use of the super-resolution image includes feature labeling, and wherein the set of tasks are associated with enhancing image data to facilitate the feature labeling.

11. The method of claim 1, wherein said each loss function is incorporated as a feed-forward only layer of the super-resolution neural network.

12. The method of claim 1, wherein the another task or set of tasks is to make the generated super-resolution image suitable for labeling by a user.

13. An apparatus for generating a super-resolution image from an input image, wherein the apparatus comprises:
    at least one processor; and
    at least one memory including computer program code for one or more programs,
    the at least one memory and the computer program code configured to, with the at least one processor, cause the apparatus to generate the super-resolution image using a combination of loss functions as one or more layers of a super resolution neural network,
    wherein each loss function of the combination of loss functions is respectively a task-specific neural network that has been pre-trained to perform a corresponding one of a set of tasks determined to facilitate generating the super-resolution image, and
    wherein the super-resolution image is a higher resolution version of the input image and is a higher quality than the input image as determined by attributes relevant to the set of tasks.

14. The apparatus of claim 13, wherein at least one of the task-specific neural network includes a detector of a feature that is to be labeled in the super-resolution image.

15. The apparatus of claim 14, wherein the feature includes a map feature.

16. The apparatus of claim 14, wherein the task-specific neural network is pre-trained to enhance the feature in image data.

17. The apparatus of claim 16, wherein the enhancing of the feature includes an image exposure correction, an image deblurring, an edge enhancement, or a combination thereof.

18. The method of claim 13, wherein the set of tasks comprises one or more members from the group consisting of feature detection, classification, recognition, and identification and the attributes comprise one or more members selected from the group consisting of exposure, sharpness, and clarity.

19. A non-transitory computer-readable storage medium for training a super resolution neural network, carrying one or more sequences of one or more instructions which, when executed by one or more processors, cause an apparatus to perform:
   determining a set of tasks to be performed on an input image to facilitate generating a super-resolution image, wherein the super-resolution image is a higher resolution version of the input image;
   selecting a combination of loss functions, wherein each loss function of the combination of loss functions is respectively a task-specific neural network that has been pre-trained to perform a corresponding one of the set of tasks, and at least one of the task-specific neural network includes a detector of a learnable map feature that is to be labeled in the super-resolution image; and
   training the super resolution neural network to generate the super-resolution image using the combination of loss functions as one or more layers of the super resolution neural network.

20. The non-transitory computer-readable storage medium of claim 19, wherein the task-specific neural network is pre-trained to enhance the feature in image data.

* * * * *